April 24, 1928.
D. B. JONES ET AL
1,667,319
REGENERATIVE FURNACE
Filed April 28, 1926  2 Sheets-Sheet 1
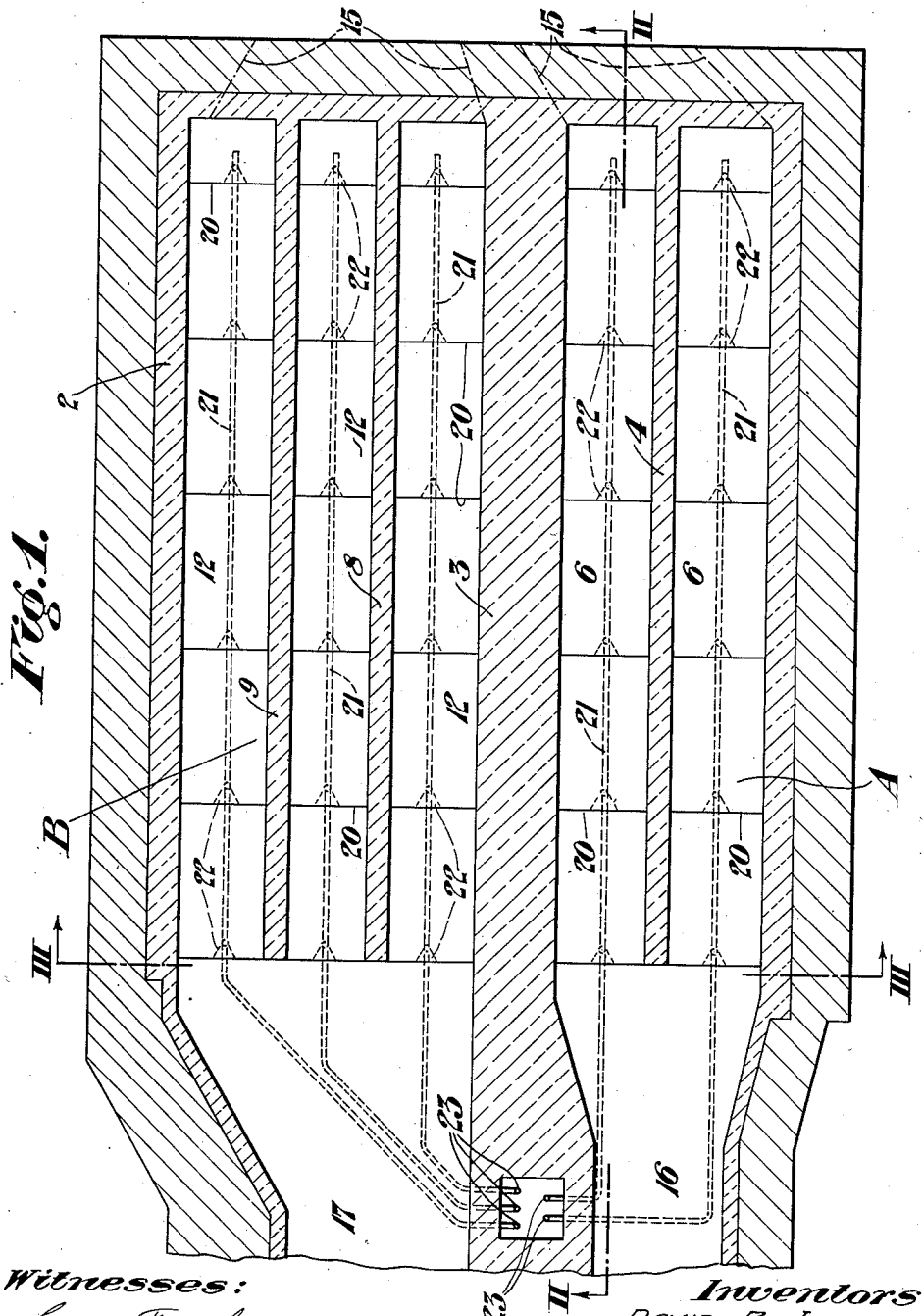
Witnesses:
Edwin Trueb
Inventors:
DAVID B. JONES and
FRANK C. SWARTZ.
by: D Anthony Usina
their Attorney.

April 24, 1928.  
D. B. JONES ET AL  
REGENERATIVE FURNACE  
Filed April 28, 1926    2 Sheets-Sheet 2
1,667,319
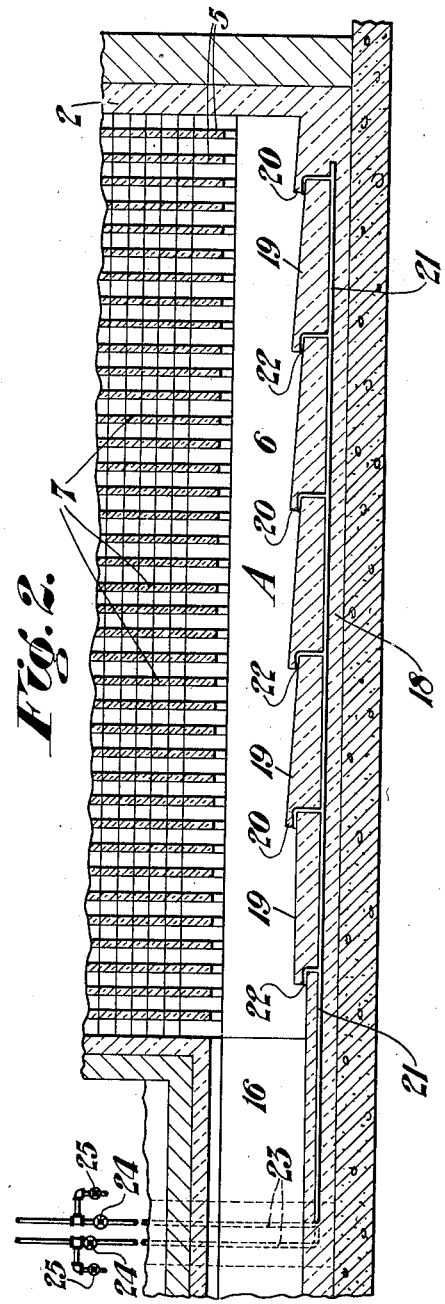
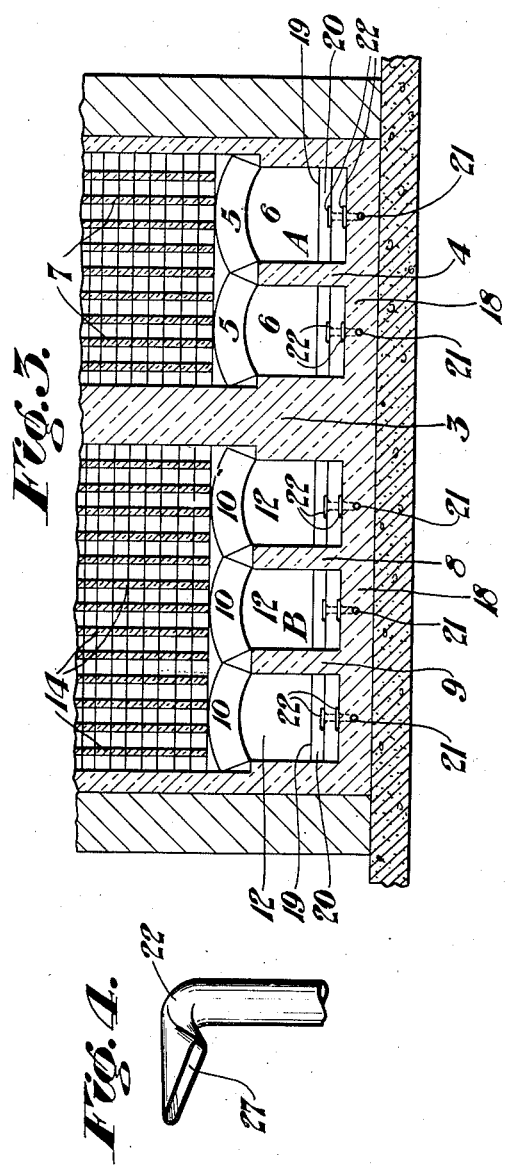
Witnesses:  
Edwin Trueb
Inventors:  
DAVID B. JONES and  
FRANK C. SWARTZ.  
by D. Anthony Usina  
their Attorney.

Patented Apr. 24, 1928.

1,667,319

UNITED STATES PATENT OFFICE.

DAVID B. JONES AND FRANK C. SWARTZ, OF CLEVELAND, OHIO.

REGENERATIVE FURNACE.

Application filed April 28, 1926. Serial No. 105,240.

This invention relates to regenerative furnaces, and more particularly to the checker-chambers of regenerative furnaces and means for and method of cleaning deposits of dust and other foreign matter from said chambers, and has for its object the provision of novel means for and method of cleaning the checker-chambers while the furnace is in operation, thereby preventing the accumulation of large deposits of dust and other foreign matter.

Heretofore there has been no known means for or method of cleaning the deposit of dust and foreign matter from under the checkers of a checker-chamber, while the furnace was in operation, and, therefore, the dust and other matter is permitted to accumulate. The accumulation of dust and other matter below the checkers causes a decrease of the draft on the furnace which interferes with the operation of the furnace and decreases the production, and also causes the brickwork of the furnace structure above the checker-chamber to be fused more rapidly. Due to the above, furnaces are caused to be taken out of service for extensive and costly repairs to the brickwork and for general cleaning of the checkers and the space below the checkers.

The present invention provides means for and a method of cleaning the checker-chambers, whereby the checker-chambers may be cleaned while the furnace is in operation, thereby permitting the checker-chambers to be kept clean, resulting in higher efficiency, greater production and increased life of the furnace.

In the drawings:

Figure 1 is a sectional plan of a regenerative chamber embodying this invention.

Figure 2 is a sectional elevation on the line II—II of Figure 1.

Figure 3 is a sectional elevation on the line III—III of Figure 1.

Figure 4 is a detail perspective view of one of the nozzles.

Referring more particularly to the drawings, the numeral 2 designates the checker-chamber as a whole which is of ordinary standard design and is divided by a vertical wall 3 into gas and air chambers A and B, respectively.

The gas chamber A is provided with a centrally arranged arch supporting wall 4 for supporting the checker-arches 5 and forming distributing spaces or flues 6 below the checker-work 7 in the gas chamber A.

The air chamber B is provided with two arch supporting walls 8 and 9 for supporting the checker-arches 10 and forming distributing spaces or flues 12 below the checker-work 14 in the air chamber B.

The one end of the checker-chamber 2 is connected by a flue 15 with the furnace, while the other end communicates through the flues 16 and 17 with the stack and with gas and air supplies, as is usual. Suitable valves are arranged for controlling the flow of air and gas and for opening and closing the passage to the stack, as is well-known, and is not shown or further described since it forms no part of the present invention.

The bottom wall 18 of the checker-chamber is preferably provided with a series of step-like portions 19 to provide a series of shoulders 20.

Pipes 21 are mounted in the bottom wall 18 so as to extend substantially centrally of each of the spaces or flues 6 and 12. The pipes 21 are mounted sufficiently deep in the floor or bottom wall 18 that they will not deteriorate from the heat within the checker-chamber.

A plurality of nozzles 22 are connected with each of the pipes 21 and extend up through the bottom wall 18 and open through the shoulders 20 and open toward the stack end of the chamber.

The pipes 21 are connected with supply pipes 23 mounted in the wall 3, which pipes are connected with a source of fluid pressure such as steam, compressed air or the like.

The pipes 23 are provided with control valves 24 and drain or drip cocks 25 above each valve whereby condensation can be removed.

In Figure 4 we have shown a special form of nozzle 22 which may advantageously be used to discharge the fluid along the bottom wall 18 of the chamber 2. This nozzle is swedged or flattened at its discharge end, as at 27, so as to provide a relatively wide, thin discharge opening to spread the force of the fluid.

In operation, the dust and other foreign matter is removed from the top of the checkers by blowing it down with fluid under pressure into the spaces or flues 6 and 12 under the checkers 7 and 14. After the checker-work is thus cleaned, or while the cleaning operation is progressing, fluid under pressure is turned into the pipes 21 to be discharged through the nozzles 22, by opening the valves 24. The fluid passing from the nozzles 22 will blow the dust and other foreign matter from the flues or spaces 6 and 12 into the stack or stack flue, and the force of the fluid from the nozzles 22 combined with the draft of the stack, will cause the dust, or at least the major portion thereof, to be carried out through the stack.

When steam is the fluid used, it becomes highly superheated as it passes through the pipes embedded in the hot brickwork or walls of the chamber.

The above apparatus and method permits the dust and other foreign matter to be cleaned from the checker-chamber while the furnace is in operation, and prevents the progressive decrease in draft and efficiency of the chamber heretofore unavoidable with the ordinary construction of checker-chambers.

While we have described and illustrated one specific embodiment of apparatus for carrying out our novel method, it will be understood that we do not wish to be limited thereto, since various modifications may be made without departing from the appended claims directed thereto.

We claim:

1. The combination with the checker-chamber of a regenerative furnace, having checker-work supported above a plurality of distributing flues extending longitudinally along the bottom of said chamber, of a plurality of fluid pressure nozzles permanently mounted at spaced longitudinal points in the bottom wall of each of said flues, and adapted to direct fluid under pressure along the bottom walls of said flues toward the stack end of said chamber to blow deposits of dust and other foreign matter from said flues into the stack, and means for supplying fluid under pressure to said nozzles.

2. The combination with the checker-chamber of a regenerative furnace, having checker-work supported above a plurality of distributing flues extending longitudinally along the bottom of said chamber, of a plurality of fluid pressure nozzles permanently mounted at spaced longitudinal points in the bottom wall of each of said flues, and adapted to direct fluid under pressure along the bottom walls of said flues toward the stack end of said chamber to blow deposits of dust and other foreign matter from said flues into the stack, fluid supply pipes mounted in the bottom walls of said flues and connected to said nozzles, and means for controlling the flow of fluid through said pipes.

In testimony whereof, we have hereunto signed our names.

DAVID B. JONES.
FRANK C. SWARTZ.